United States Patent
Suzuki

(10) Patent No.: US 7,978,570 B2
(45) Date of Patent: Jul. 12, 2011

(54) DRIVING APPARATUS AND METHOD, PROGRAM, AND RECORDING MEDIUM

(75) Inventor: Yuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 12/432,378

(22) Filed: Apr. 29, 2009

(65) Prior Publication Data

US 2009/0316556 A1 Dec. 24, 2009

(30) Foreign Application Priority Data

Jun. 24, 2008 (JP) .................................. 2008-164445

(51) Int. Cl.
G11B 7/00 (2006.01)

(52) U.S. Cl. .............. 369/44.29; 369/44.14; 369/112.01

(58) Field of Classification Search .......................... None
See application file for complete search history.

(56) References Cited

U.S. PATENT DOCUMENTS

| 6,097,690 | A | 8/2000 | Mochizuki et al. |
| 6,424,605 | B1 * | 7/2002 | Iida ............................ 369/44.27 |
| 6,813,229 | B1 | 11/2004 | Gotou et al. |
| 2006/0198264 | A1 * | 9/2006 | Ueno et al. ................. 369/53.22 |

FOREIGN PATENT DOCUMENTS

| JP | 64-32431 | 2/1989 |
| JP | 3-203031 | 9/1991 |
| JP | 3561735 | 6/2004 |
| JP | 3575181 | 7/2004 |
| JP | 3782562 | 3/2006 |

* cited by examiner

Primary Examiner — Muhammad N Edun
(74) Attorney, Agent, or Firm — Oblon, Spivak, McClelland, Maier & Neustadt, L.L.P.

(57) ABSTRACT

A driving apparatus includes: a driving mechanism slider-driving a head including a first optical pickup and a second optical pickup, the first optical pickup and the second optical pickup having a same specification; a calculating mechanism performing predetermined calculation using a first slide-error signal obtained by filtering a signal from the first optical pickup and a second slide-error signal obtained by filtering a signal from the second optical pickup; and an outputting mechanism outputting a signal from the calculating means as a slider control signal for driving the driving mechanism.

5 Claims, 4 Drawing Sheets

DRIVING APPARATUS AND METHOD, PROGRAM, AND RECORDING MEDIUM

BACKGROUND OF THE INVENTION

1. Field of the Invention

The present invention relates to a driving apparatus and method, a program, and a recording medium. More particularly, the present invention relates to a driving apparatus which improves speed of recording onto and playing back from a predetermined disc, and to a method, a program, and a recording medium.

2. Description of the Related Art

In recent years, the recording and the playback of high-quality video data are becoming widespread. Such high-quality video data tends to have a large volume. Accordingly, the amount of data to be written on a predetermined disc at recording time becomes large, and thus it is necessary to write data on a disc at a high speed. It has been therefore proposed to increase the number of rotations of a disc spindle in order to increase a recording speed.

SUMMARY OF THE INVENTION

However, if the number of rotations of a disc spindle is increased, sound of the rotation increases, and the sound might be recorded in the case of a video camera, for example. Accordingly, it has not been a preferable solution to improve the recording speed by increasing the number of rotations of a disc spindle.

Thus, it is thought that optical systems of two channels, each of which has a same specification, are provided, and recording processing is performed using the two channels simultaneously. In an apparatus having two channels, it is thought that the two channels are disposed at opposite positions to each other, and each of the channels is provided with a slider, respectively. With this arrangement, it becomes possible to slider-control the individual channels independently, and to perform recording operation on a predetermined disc simultaneously. Thus, it becomes possible to improve a recording speed.

However, if the two channels are disposed at opposite positions to each other, and each of the channels is provided with a slider, respectively, the apparatus becomes large. Thus, this configuration is not suitable for a portable recording apparatus (for example, a video camera), etc. Under these circumstances, it has been desirable to provide a new mechanism in order to improve a recording speed without increasing a rotational speed and the size of the apparatus itself.

The present invention has been made in view of such circumstances. It is desirable to provide one head with optical systems of two channels, and to control the head by one-system slider so as to allow the slider to be suitably controlled for the two channels.

According to an embodiment of the present invention, there is provided a driving apparatus including: driving means for slider-driving a head including a first optical pickup and a second optical pickup, the first optical pickup and the second optical pickup having a same specification; calculating means for performing predetermined calculation using a first slide-error signal obtained by filtering a signal from the first optical pickup and a second slide-error signal obtained by filtering a signal from the second optical pickup; and outputting means for outputting a signal from the calculating means as a slider control signal for driving the driving means.

In the embodiment of the present invention, the calculating means may calculate an average of the first slide-error signal and the second slide-error signal.

According to another embodiment of the present invention, there is provided a method of driving in a driving apparatus provided with driving means for slider-driving a head including a first optical pickup and a second optical pickup, the first optical pickup and the second optical pickup having a same specification, the method including the steps of: performing predetermined calculation using a first slide-error signal obtained by filtering a signal from the first optical pickup and a second slide-error signal obtained by filtering a signal from the second optical pickup; and outputting a calculated signal as a slider control signal for driving the driving means.

According to another embodiment of the present invention, there is provided a computer-readable program for causing a driving apparatus provided with driving means for slider-driving a head including a first optical pickup and a second optical pickup, the first optical pickup and the second optical pickup having a same specification, to perform processing, the processing including the steps of: performing predetermined calculation using a first slide-error signal obtained by filtering a signal from the first optical pickup and a second slide-error signal obtained by filtering a signal from the second optical pickup; and outputting a calculated signal as a slider control signal for driving the driving means.

According to another embodiment of the present invention, there is provided a recording medium storing a computer-readable program for causing a driving apparatus provided with driving means for slider-driving a head including a first optical pickup and a second optical pickup, the first optical pickup and the second optical pickup having a same specification, to perform processing, the processing including the steps of: performing predetermined calculation using a first slide-error signal obtained by filtering a signal from the first optical pickup and a second slide-error signal obtained by filtering a signal from the second optical pickup; and outputting a calculated signal as a slider control signal for driving the driving means.

In a driving apparatus and method, a program, and a recording medium according to an embodiment of the present invention, recording and playback are performed simultaneously by pickups having a same specification. A slider control signal is produced by calculating an average value of a slide error signal obtained from one of the pickups and a slide error signal obtained from the other of the pickups.

By an embodiment of the present invention, one head is provided with optical systems of two channels. When control is performed by one-system slider, it becomes possible to suitably perform slider control on both of the two channels. Also, it becomes possible to perform recording and playback at a high speed using the two channels by performing suitable side control.

DESCRIPTION OF THE PREFERRED EMBODIMENTS

In the following, a description will be given of an embodiment of the present invention with reference to the drawings.

Figure 1:
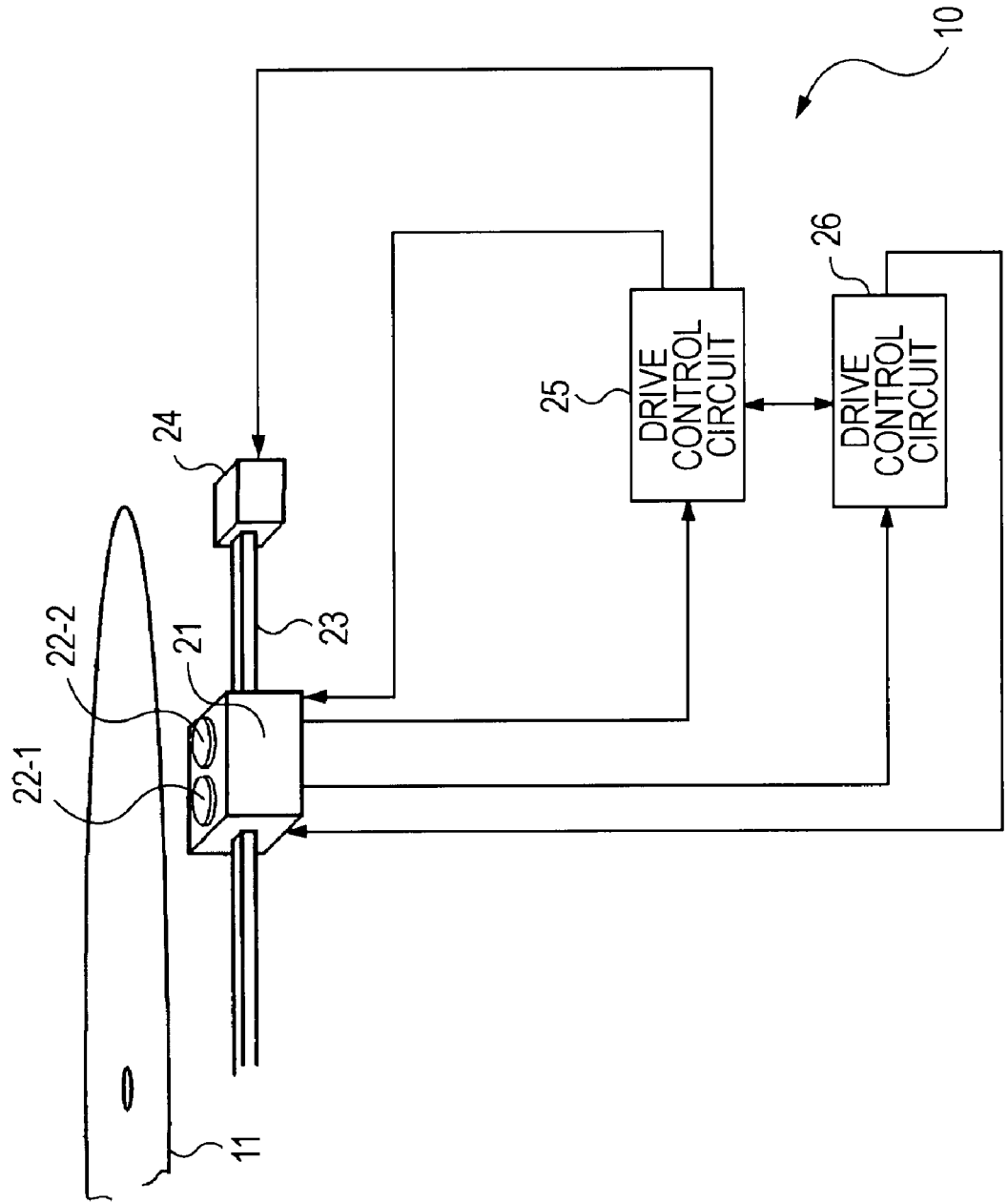
FIG. 1 is a diagram illustrating a configuration of a driving apparatus according to an embodiment of the present invention.

FIG. 1 is a diagram illustrating a configuration of a driving apparatus according to an embodiment of the present invention. A driving apparatus 10 shown in FIG. 1 is an apparatus which drives a predetermined disc, records data on the disc, and plays back data recorded on the disc. Here, a description will be mainly given of an operation at the time of recording as an example.

The driving apparatus 10 shown in FIG. 1 drives a disc 11 as a predetermined disc. The disc 11 is, for example a DVD (Digital Versatile Disc) or a BD (Blu-ray Disc). The driving apparatus 10 includes an optical head 21, an optical pickup 22-1, an optical pickup 22-2, a slider 23, a slide motor 24, a drive control circuit 25, and a drive control circuit 26.

The driving apparatus 10 shown in FIG. 1 has a configuration in which one optical head 21 is provided with two optical pickups 22-1, 22-2. In the following, such a configuration is described as one head with two-pickup. Also, when it is not necessary to distinguish the optical pickup 22-1 and the optical pickup 22-2, a description will be simply given as an optical pickup 22.

The optical pickup 22-1 and the optical pickup 22-2 are optical pickups having a same specification. The optical pickup 22-1 and the optical pickup 22-2 operates simultaneously to record data on the disc 11. Thus, it becomes possible to record data two times the amount of data recorded by one optical pickup 22. Accordingly, it becomes possible to perform recording-time processing at a high speed.

The optical head 21 is moved in the horizontal direction with respect to the disc 11 by the slider 23. The slider 23 is driven by the slide motor 24. A control signal (slide-motor driving signal) of the slide motor 24 is supplied from the drive control circuit 25. A signal from the optical pickup 22-1 is supplied to the drive control circuit 25. From that signal, a signal (track actuator driving current) for controlling the optical pickup 22-1 is generated, and is supplied to the optical pickup 22-1.

Figure 2:
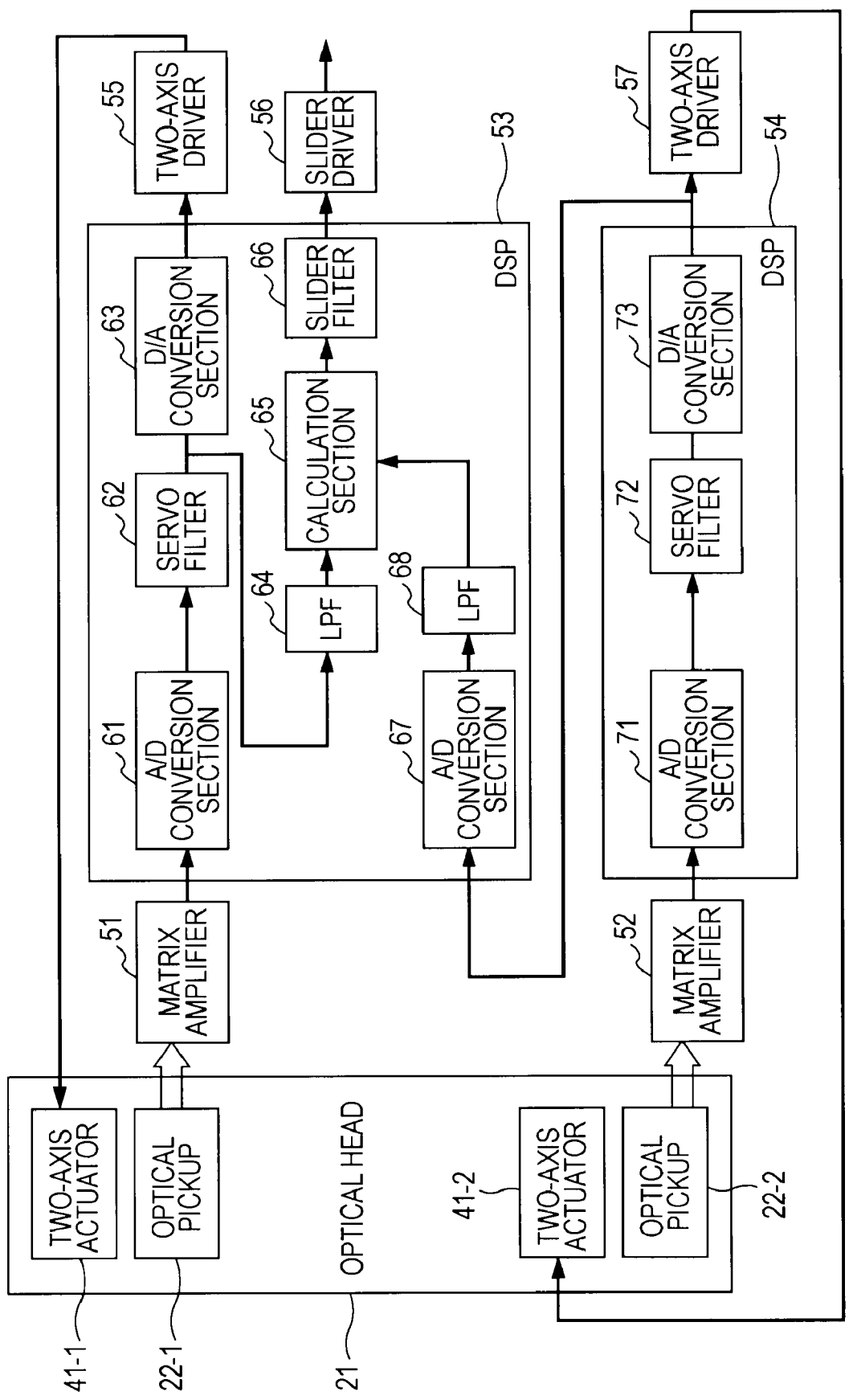
FIG. 2 is a diagram illustrating an example of a detailed configuration of the driving apparatus.

In the same manner, a signal from the optical pickup 22-2 is supplied to the drive control circuit 26. From that signal, a signal (track actuator driving current) for controlling the optical pickup 22-2 is generated, and is supplied to the optical pickup 22-2. The drive control circuit 25 and the drive control circuit 26 control the optical pickup 22-1 and the optical pickup 22-2, respectively. The configurations of the drive control circuits 25 and 26 are different as shown in FIG. 2 (in FIG. 2, a DSP 53 and a DSP 54 have different configurations). Also, the optical pickup 22-1 and the optical pickup 22-2 are both mounted on the optical head 21, and are necessary to perform coordinated operation, for example, to write data onto the disc 11 simultaneously. A signal for that operation is exchanged between the drive control circuit 25 and the drive control circuit 26.

Also, the optical pickup 22-1 and the optical pickup 22-2 are configured so that they can record data on the disc 11 at a constant linear velocity (CLV). That is to say, objective lens actuators (for example, a two-axis actuator 41-1 and a two-axis actuator 41-2 shown in FIG. 2) are disposed such that laser spots are focused on adjacent positions (for example, about few hundred μ meters) allowing a linear velocity error. Also, in the recording using one head with two pickups, individual optical pickups 22 record continuous data of a certain capacity, then the optical pickups 22 perform track jump simultaneously, and the optical pickups 22 record the next continuous data.

In the case of the driving apparatus 10 having a configuration of one head with two pickups, only one system of the slider 23 is provided. Unless adequate slider control is performed, for example if adequate slider control is performed only on one of the optical pickups 22, it might become inadequate slider control on the other of the optical pickups 22.

It is desirable that the capacity of continuous recording by one head with two pickups (by two channels) match the distance between the optical pickups 22 (between objective lenses included in the optical pickups 22). If the distance between the objective lenses of the individual optical pickups 22 have variations from design values, the variations become offsets of the objective lenses. In general, slider control is performed by performing feedback control so that lower frequency components of the drive current of the track actuator become zero.

However, if optimum slider control for one of the channels, for example the optical pickup 22-1, is performed, an error of the distance between the objective lenses all becomes an error of the other of the channels (for example, the optical pickup 22-2), and becomes an offset of the objective lens. To put it another way, if slider control is performed on the basis of the signal from the optical pickup 22-1, an error of the optical pickup 22-1, etc., are eliminated, but slider control is performed without considering an error of the optical pickup 22-2. Thus, slider control may become inadequate for the optical pickup 22-2.

That is to say, if slider control is performed by one head with two pickups using only the amount of tracking control of one channel, variations of the distance between the two optical pickups 22 may directly become shifts of the objective lens of the actuator of the optical pickup 22 that is not subjected to slider control.

In general, a range of guarantee of optical characteristics of an objective lens actuator is about a few hundred μ meters, and thus there is not so much margin with respect to estimates on an eccentricity of a disc and a disc chucking error. It is therefore necessary to restrain an offset of an objective lens, which is specific to a method of one head with two channels, as much as possible.

Figure 3:
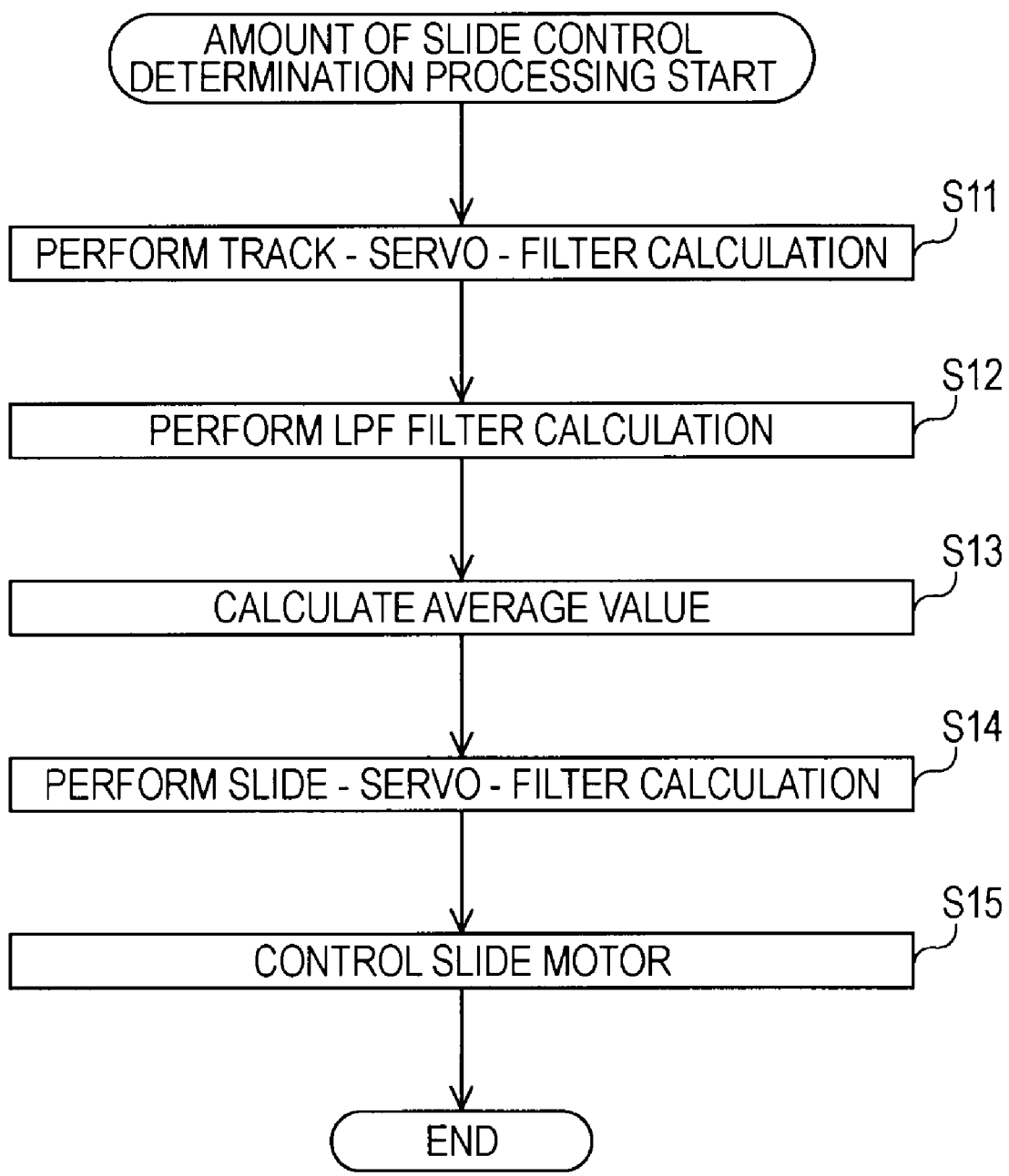
FIG. 3 is a flowchart illustrating an operation of the driving apparatus.

Accordingly, the driving apparatus 10 has a configuration shown in FIG. 2, and performs processing as shown in FIG. 3. Thus, the influence of an error in the distance between the objective lenses is restrained to one half or less compared with a method of performing slider control that is optimized for one objective lens.

FIG. 2 is a diagram illustrating an example of a detailed configuration of the drive control circuit 25 and the drive control circuit 26 shown in FIG. 1. The optical head 21 is provided with the optical pickup 22-1 and the two-axis actuator 41-1 which controls a moving direction and a moving distance (tracking direction and focus direction) of the optical pickup 22-1. Further, the optical head 21 is provided with the optical pickup 22-2 and the two-axis actuator 41-2.

The optical pickup 22-1 and the optical pickup 22-2 individually include a light source and an objective lens, and emit laser light on the disc 11 in order to record data or reproduce data. Information based on return light of laser light, which is emitted by the optical pickup 22-1 and reflected back from the disc 11, is supplied to a matrix amplifier 51. In the same manner, information based on return light of laser light, which is emitted by the optical pickup 22-2 and reflected back from the disc 11, is supplied to a matrix amplifier 52.

The matrix amplifier 51 generates a tracking error signal, and supplies the signal to an A/D (Analog/Digital) conversion section 61 of a DSP (Digital Signal Processor) 53. The DSP 53 includes the A/D conversion section 61, a servo filter 62, a D/A (Digital/Analog) conversion section 63, an LPF (Low Pass Filter) 64, a calculation section 65, a slider filter 66, an A/D conversion section 67, and an LPF 68.

The A/D conversion section 61 of the DSP 53 converts the supplied tracking error signal into a digital signal, and supplies the digital signal to the servo filter 62. The servo filter 62 is a phase compensation filter, and is provided for stabilizing the servo loop. Also, the servo filter 62 (or a subsequent-stage portion not shown in the figure) multiplies the phase-compensated tracking error signal by a predetermined coefficient called a servo gain so as to amplify the error signal.

The signal from the servo filter 62 is supplied to the D/A conversion section 63 and the LPF 64 as a tracking control signal. The D/A conversion section 63 converts the supplied tracking control signal into an analog signal, and supplies the signal to a two-axis driver 55. The two-axis driver 55 drives the two-axis actuator 41-1 of the optical pickup 22-1 on the basis of the supplied tracking control signal. By such a single servo loop, tracking control and focusing control of the optical pickup 22-1 is achieved.

At the same time, only low frequency components of the tracking control signal supplied to the LPF 64 are extracted, and are supplied to the calculation section 65. The low frequency components of the tracking control signal are used for slide error signal (a signal indicating an error of the slider 23). A signal from the LPF 68 is also supplied to the calculation section 65. A signal input into the LPF 68 is a signal converted into a display signal by the A/D conversion section 67, which is a signal supplied from the DSP 54.

The DSP 54 includes an A/D conversion section 71, a servo filter 72, and a D/A conversion section 73. The A/D conversion section 71, the servo filter 72, and the D/A conversion section 73 correspond to the A/D conversion section 61, the servo filter 62, and the D/A conversion section 63 of the DSP 53, respectively, and performs the same processing. That is to say, the A/D conversion section 71, the servo filter 72, and the D/A conversion section 73 generate a tracking control signal which is supplied to a two-axis driver 57. Then, a signal for driving the two-axis actuator 41-2 of the optical pickup 22-2 is generated. By such a single servo loop, tracking control and focusing control of the optical pickup 22-2 are achieved.

The tracking control signal from the DSP 54 is supplied to the calculation section 65 through the A/D conversion section 67 and the LPF 68 of the DSP 53. That is to say, the tracking control signal from the DSP 54 is converted into a slide error signal by the DSP 53. In this manner, a signal produced by filtering the tracking control signal from the optical pickup 22-1 by the LPF 64, and a signal produced by filtering the tracking control signal from the optical pickup 22-2 by the LPF 68 are supplied to the calculation section 65.

To put it another way, a slide error signal produced by the signal from the optical pickup 22-1 and a slide error signal produced by the signal from the optical pickup 22-2 are supplied to the calculation section 65.

The calculation section 65 calculates the average value of these two slider control signals, and supplied the value to a slider filter 66. The slider filter 66 performs predetermined filtering on the signal, and then supplies the signal to the slider driver 56 as a slider control signal (a signal controlling the slide motor 24) controlling the slider 23. The slider driver 56 controls the slide motor 24 on the basis of the slider control signal produced from the average value of the signals from the two optical pickups 22.

A description will be given of an operation of the driving apparatus 10 having such a configuration, mainly of control on the slide motor 24, with reference to a flowchart in FIG. 3.

In step S11, track-servo-filter calculation is performed. This processing is performed by a servo loop including the optical pickup 22-1, the matrix amplifier 51, the A/D conversion section 61, the servo filter 62, the D/A conversion section 63, and the two-axis driver 55. In the same manner, the processing is performed by a servo loop including the optical pickup 22-2, the matrix amplifier 52, the A/D conversion section 71, the servo filter 72, the D/A conversion section 73, and the two-axis driver 57. By these servo loops, the tracking control signal is generated, and the tracking is controlled.

In step S12, the tracking control signals supplied from individual servo loops are subjected to filtering by the LPF 64 and the LPF 68, respectively. By being subjected to the filtering, slider error signals are generated. In step S13, the calculation section 65 calculates the average value of the slide error signals after the filtering by the LPF 64 and the LPF 68. In step S14, the slider filter 66 performs filtering calculation to generate a slider control signal.

In step S15, the slider driver 56 drives the slide motor 24 on the basis of the slider control signal supplied from the slider filter 66.

In this manner, individual signals obtained from the optical pickup 22-1 and the optical pickup 22-2, which are mounted on one optical head 21, are averaged to generate the slider control signal. Accordingly, even if the disposition distance of the two actuators has an error from a design value, an offset of the objective lens per one channel is averaged, and thus the influence becomes one half or less.

Also, with this arrangement, it becomes possible to adequately perform slider control, and it becomes possible to simultaneously write data on the disc 11 by the two optical pickups 22. Thereby, it becomes possible to write data at a high speed.

In this regard, in the above-described embodiment, a description has been given of the processing at the time of writing (recording). However, it is also possible to adequately perform slider control at the time of playback by the same processing. Also, by playing back using the two optical pickups 22, it becomes possible to read data at a high speed.

In this regard, in the above-described embodiment, the average value of the signals obtained from the two optical pickups 22 is calculated. However, a calculation other than an average may be made. For example, if it is identified that one of the optical pickups 22 includes an error, a calculation may be performed with a weight on that optical pickup 22. That is to say, the calculation section 65 may perform calculation so as to cancel the error of the two optical pickups 22.

In this regard, in the above-described embodiment, a description has been given of an example of one head with two pickups. However, the present invention can be applied to the case of one head with a plurality of pickups, for example, in the case of one head with three pickups.

The above-described series of processing, for example processing of obtaining two tracking control signals and calculating an average, can be executed by hardware or by software. When the series of processing is executed by software, the programs constituting the software may be installed in a computer built in a dedicated hardware. Alternatively, the programs may be installed from a program recording medium, for example in a general-purpose personal computer capable of executing various functions by installing various programs.

Figure 4:
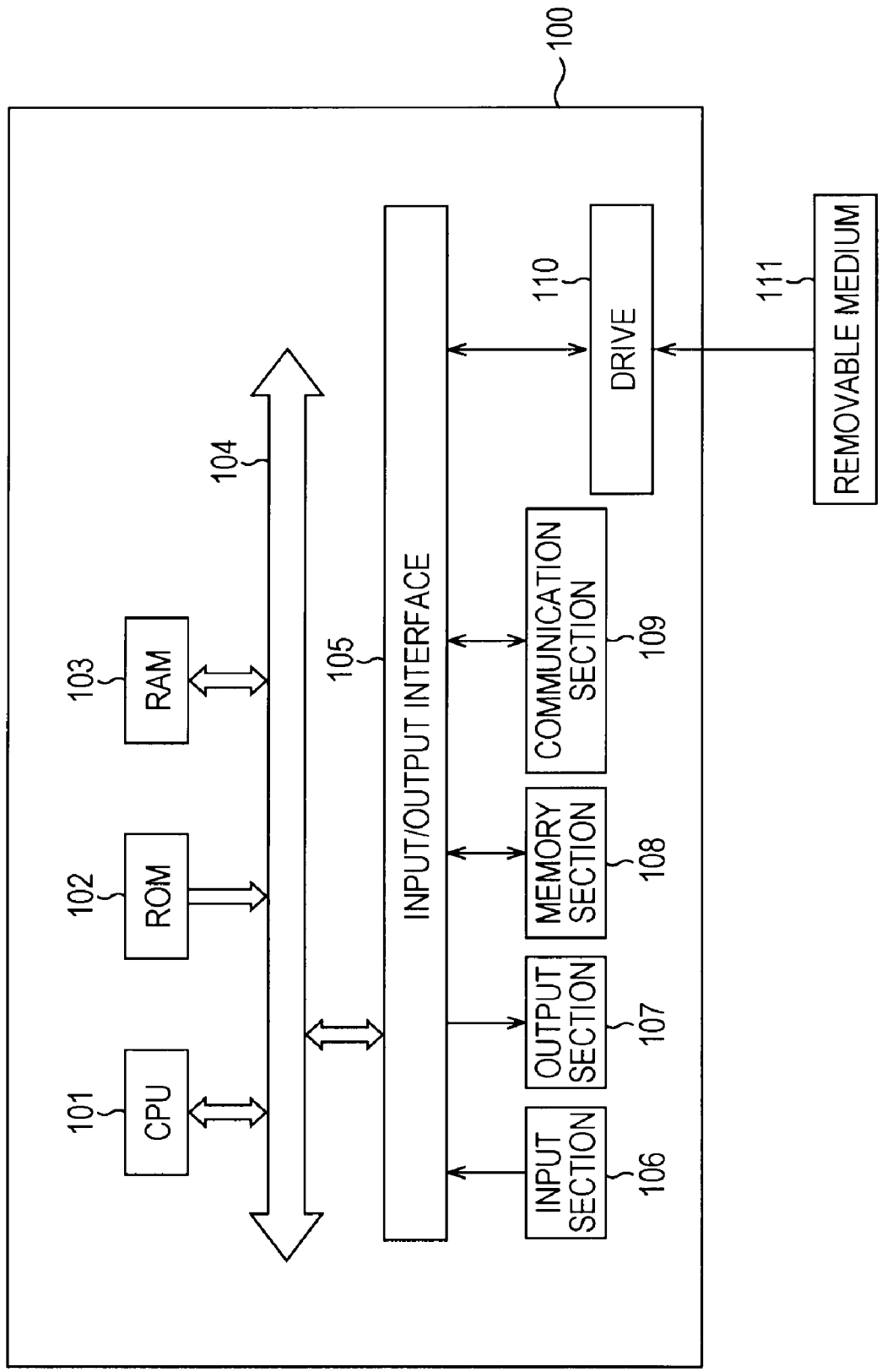
FIG. 4 is a diagram illustrating a recording medium.

FIG. 4 is a block diagram illustrating an example of a hardware configuration of a personal computer which executes the above-described series of processing by programs.

In the computer, a CPU (Central Processing Unit) 101, a ROM (Read Only Memory) 102, a RAM (Random Access Memory) 103 are mutually connected through a bus 104.

An input/output interface 105 is also connected to the bus 104. An input section 106 including a keyboard, a mouse, a microphone, etc., an output section 107 including a display, a speaker, etc., a storage section 108 including a hard disk, a nonvolatile memory, etc., a communication section 109 including a network interface, etc., and a drive 110 for driving a removable medium 111, such as a magnetic disk, an optical disc, a magneto-optical disc, or a semiconductor memory, etc., are connected to the input/output interface 105.

In the computer having the configuration as described above, the CPU 101 loads the program stored, for example in storage section 108 to the RAM 103 through the input/output interface 105 and the bus 104 to execute the program, thereby the above-described series of processing is performed.

The program to be executed by the computer (CPU 101) is recorded in a removable medium 111, which is a package medium including, such as a magnetic disk (including a flexible disk), an optical disc (including a CD-ROM (Compact Disc-Read Only Memory), a DVD (Digital Versatile Disc), etc.), a magneto-optical disc, or a semiconductor memory, etc. Alternatively, the program may be provided through wired or wireless transmission, such as a local area network, the Internet, a digital satellite broadcasting, etc.

The program can be installed in the storage section 108 through the input/output interface 105 by attaching the removable medium 111 to the drive 110. Also, the program can be received by the communication section 109 through wired or wireless transmission medium and can be installed in the storage section 108. In addition, the program may be pre-installed in the ROM 102 or the storage section 108 in advance.

In this regard, the program executed by the computer may be a program that is processed in time series in accordance with the described sequence in this specification. Also, the programs may be the programs to be executed in parallel or at necessary timing, such as at the time of being called, or the like.

Also, in this specification, a system represents an overall apparatus constituted by a plurality of apparatuses.

The present application contains subject matter related to that disclosed in Japanese Priority Patent Application JP 2008-164445 filed in the Japan Patent Office on Jun. 24, 2008, the entire content of which is hereby incorporated by reference.

In this regard, an embodiment of the present invention is not limited to the above-described embodiments. It is possible to make various changes without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A driving apparatus comprising:
   driving means for slider-driving a head including a first optical pickup and a second optical pickup, the first optical pickup and the second optical pickup having a same specification;
   calculating means for performing predetermined calculation using a first slide-error signal obtained by filtering a signal from the first optical pickup and a second slide-error signal obtained by filtering a signal from the second optical pickup; and
   outputting means for outputting a signal from the calculating means as a slider control signal for driving the driving means.

2. The driving apparatus according to claim 1,
   wherein the calculating means calculates an average of the first slide-error signal and the second slide-error signal.

3. A method of driving in a driving apparatus provided with driving mechanism for slider-driving a head including a first optical pickup and a second optical pickup, the first optical pickup and the second optical pickup having a same specification, the method comprising:
   performing predetermined calculation using a first slide-error signal obtained by filtering a signal from the first optical pickup and a second slide-error signal obtained by filtering a signal from the second optical pickup; and
   outputting a calculated signal as a slider control signal for driving the driving mechanism.

4. A recording medium storing a computer-readable program for causing a driving apparatus provided with driving mechanism for slider-driving a head including a first optical pickup and a second optical pickup, the first optical pickup and the second optical pickup having a same specification, to perform processing, the processing comprising:
   performing predetermined calculation using a first slide-error signal obtained by filtering a signal from the first optical pickup and a second slide-error signal obtained by filtering a signal from the second optical pickup; and
   outputting a calculated signal as a slider control signal for driving the driving mechanism.

5. A driving apparatus comprising:
   a driving mechanism slider-driving a head including a first optical pickup and a second optical pickup, the first optical pickup and the second optical pickup having a same specification;
   a calculating mechanism performing predetermined calculation using a first slide-error signal obtained by filtering a signal from the first optical pickup and a second slide-error signal obtained by filtering a signal from the second optical pickup; and
   an outputting mechanism outputting a signal from the calculating mechanism as a slider control signal for driving the driving mechanism.

* * * * *